(12) United States Patent
Dubey et al.

(10) Patent No.: US 10,221,276 B2
(45) Date of Patent: Mar. 5, 2019

(54) SELF-HEALING EPOXY RESIN COMPOSITION

(71) Applicant: ADITYA BIRLA CHEMICALS (THAILAND) LTD., Rayong (TH)

(72) Inventors: Pradip Kumar Dubey, Bhagwanpur (IN); Amit Dixit, Bhopal (IN); Pankaj Verma, Sotiyana (IN)

(73) Assignee: Aditya Birla Chemicals (Thailand) Ltd., A. Muangrayong (TH)

( * ) Notice: Subject to any disclaimer, the term of this patent is extended or adjusted under 35 U.S.C. 154(b) by 240 days.

(21) Appl. No.: 15/025,215

(22) PCT Filed: Sep. 26, 2014

(86) PCT No.: PCT/IB2014/001928
§ 371 (c)(1),
(2) Date: Mar. 25, 2016

(87) PCT Pub. No.: WO2015/044757
PCT Pub. Date: Apr. 2, 2015

(65) Prior Publication Data
US 2016/0229950 A1 Aug. 11, 2016

(30) Foreign Application Priority Data
Sep. 27, 2013 (IN) .......................... 2875/DEL/2013

(51) Int. Cl.
*C08G 59/40* (2006.01)
*C08L 63/00* (2006.01)
*C08K 3/36* (2006.01)
*C08G 77/388* (2006.01)

(52) U.S. Cl.
CPC ............ *C08G 59/4085* (2013.01); *C08K 3/36* (2013.01); *C08L 63/00* (2013.01); *C08G 77/388* (2013.01)

(58) Field of Classification Search
CPC ..................................................... C08L 63/00
USPC ................................................. 525/476, 533
See application file for complete search history.

(56) References Cited

U.S. PATENT DOCUMENTS

| | | | |
|---|---|---|---|
| 4,647,605 A | | 3/1987 | Ando et al. |
| 5,349,029 A | * | 9/1994 | Nam ........................ C08L 61/06 523/429 |
| 6,468,639 B2 | * | 10/2002 | Ishikawa .............. C09D 179/08 257/E23.119 |
| 8,399,577 B2 | | 3/2013 | Singh et al. |
| 2002/0061971 A1 | * | 5/2002 | Yamaguchi ............. C08L 63/00 525/107 |
| 2007/0088110 A1 | | 4/2007 | Kohl et al. |
| 2012/0208924 A1 | | 8/2012 | Singh et al. |
| 2014/0262192 A1 | * | 9/2014 | Boday ................. H01L 23/3737 165/185 |

FOREIGN PATENT DOCUMENTS

| | | |
|---|---|---|
| EP | 0511670 | 11/1992 |
| JP | 63-130619 | * 6/1988 |
| JP | 02-258829 | * 10/1990 |
| JP | H0259185 | 12/1990 |
| WO | WO 2010/031445 | 3/2010 |
| WO | WO 2013/042052 | 3/2013 |

OTHER PUBLICATIONS

Abstract for JP 63-130619 (Jun. 1988).*
Abstract for JP 02-258829 (Oct. 1990).*
International Search Report from PCT/IB2014/001928, dated Feb. 6, 2015, 2 pages.
Written Opinion from PCT/IB2014/001928, dated Feb. 6, 2015, 6 pages.

* cited by examiner

*Primary Examiner* — Marc S Zimmer
(74) *Attorney, Agent, or Firm* — Klarquist Sparkman, LLP

(57) ABSTRACT

A self-healing hydrophobic epoxy resin composition is provided. The self-healing epoxy resin composition comprises an epoxy resin component and a hardener component, the hardener component comprises at least 0.1 weight % of a modified epoxy resin hardener. The modified epoxy resin hardener is a reaction product of an amino modified oligomericsiloxane and a carboxylic acid anhydride. A process for preparing the modified epoxy resin hardener is also disclosed.

21 Claims, 2 Drawing Sheets

| Panels |  |  |  |  |
|---|---|---|---|---|
| QUV (hrs.) | Initial | 100 | 500 | 1000<br>No Visual change/<br>No Discoloration/<br>No Chalking |

| Panels |  |  |  |  |
|---|---|---|---|---|
| | Before plasma exposure | Immediately after plasma exposure | 1 hour after plasma exposure | 24 hours after plasma exposure |
| HC | 1 | 7 | 3 | 2 |

SELF-HEALING EPOXY RESIN COMPOSITION

CROSS REFERENCE TO RELATED APPLICATIONS

This is the U.S. National Stage of International Application No. PCT/IB2014/001928 filed Sep. 26, 2014, which was published in English under PCT Article 21(2), which in turn claims the benefit of India Application No. 2875/DEU2013, filed in India on Sep. 27, 2013. Both applications are incorporated herein by reference in their entirety.

The present disclosure relates to a self-healing epoxy resin composition, an epoxy resin hardener, and method for preparing the same. In particular the present disclosure relates to a self-healing epoxy resin composition suitable for electrical insulating applications.

BACKGROUND

Epoxy resin compositions are the preferred polymeric insulating materials for medium and high voltage electrical insulating applications as these provide optimum combination of process and performance properties such as mechanical, thermal and electrical properties. Conventionally cycloaliphatic epoxies cured using acid anhydride hardeners are used for outdoor electrical applications as these enable high resistance to UV weathering. The performance of these compositions is however limited in regions of high humidity involving high precipitation levels and polluted environments where the formation of conductive layer causes considerable reduction in insulation performance leading to increased surface leakage current and arching.

In order to be used in regions having high precipitation levels and polluted environments, epoxy resin compositions should preferably be self-healing and possess hydrophobic properties. Self-healing epoxy resin compositions are able to perform better in such environments as they are able to recover from any damage that may have been caused by environmental factors such as high precipitation and pollution. Hydrophobic properties also help epoxy resins in resisting damage caused under severe climatic conditions.

Since epoxy resins are relatively polar in nature they do not possess hydrophobic properties. Prior art discloses imparting hydrophobic behavior to epoxy resin compositions by addition of pretreated mineral fillers, silicon compounds, polysiloxane/polyether copolymers, hydroxyl terminated polysiloxanes, organopolysiloxane oils. These compounds however demonstrate weak hydrophobic effect and the lack of crosslinking results in phase separation and reduction of adhesion with metals.

In recent years epoxy resin compositions having intrinsic hydrophobicity have been developed by physical or chemical modification of the cycloaliphatic resins with oligomericsiloxanes having terminal glycidyl groups. However, such compositions have inadequate storage stability resulting in shorter shelf life.

Epoxy resin compositions cured using hardeners that have been modified with organopolysiloxanes having epoxy or carbinol functional groups are also known. For example, Japanese Patent Publication Number 2-59185 [59,185/90] and EP 0511670 disclose epoxy resin compositions which contain the reaction product of carboxylic acid-modified organopolysiloxane and epoxy resin. However, such epoxy resin compositions suffer from phase separation and are not stable which limits their commercial use.

Therefore, there is a need for an epoxy resin composition that is self-healing, has intrinsic hydrophobicity and is stable. There is also a need for an epoxy resin hardener that when used for curing an epoxy resin imparts intrinsic hydrophobicity and self-healing property to the resultant epoxy resin composition.

SUMMARY

A self-healing epoxy resin composition is provided. The self-healing epoxy resin composition comprises an epoxy resin component and a hardener component. The hardener component comprises at least 0.1 weight % of a modified epoxy resin hardener. The modified epoxy resin hardener is a reaction product of an amino modified oligomericsiloxane and a carboxylic acid anhydride.

A process for preparing an epoxy resin hardener is also disclosed. The process comprises heating an amino modified oligomericsiloxane to a temperature in a range of 80° C. to 90° C.; adding a carboxylic acid anhydride to the heated amino modified oligomericsiloxane to obtain a mixture thereof; and heating the mixture to a temperature in a range of 80 to 140° C. to obtain the epoxy resin hardener, the entire process being carried out under nitrogen atmosphere.

BRIEF DESCRIPTION OF ACCOMPANYING DRAWINGS

DETAILED DESCRIPTION

Figure 1:
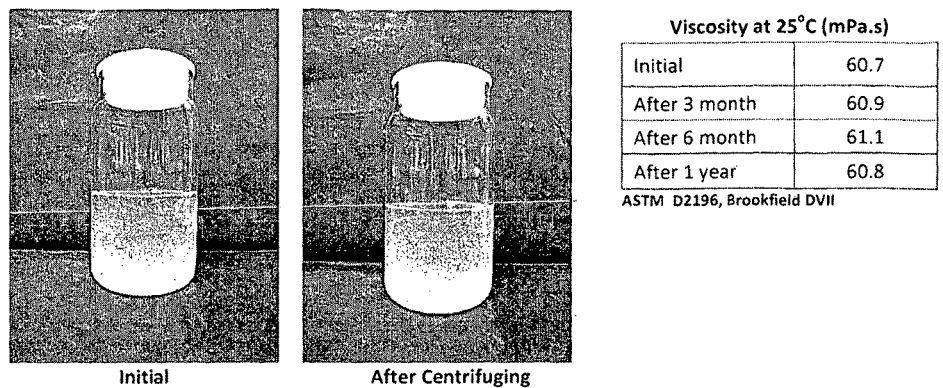
FIG. 1 illustrates the stability of the hardener component in accordance with an embodiment.

For the purpose of promoting an understanding of the principles of the invention, reference will now be made to embodiments and specific language will be used to describe the same. It will nevertheless be understood that no limitation of the scope of the invention is thereby intended, such alterations and further modifications in the disclosed process, and such further applications of the principles of the invention therein being contemplated as would normally occur to one skilled in the art to which the invention relates.

It will be understood by those skilled in the art that the foregoing general description and the following detailed description are exemplary and explanatory of the invention and are not intended to be restrictive thereof.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The disclosure relates to a hydrophobic self-healing epoxy resin composition. The "hydrophobic self-healing epoxy resin composition" will hereinafter be referred to as epoxy resin composition for the sake of simplicity. The epoxy resin composition comprises of an epoxy resin component and a hardener component wherein at least a part of the hardener component is a modified epoxy resin hardener, the modified epoxy resin hardener being a reaction product of a modified oligomericsiloxane and a carboxylic acid anhydride.

The modified oligomericsiloxane is an amino modified oligomericsiloxane having at least one amino group in each molecule. The amino group may be present at single end, both ends or side chain of the amino modified oligomericsiloxane.

The amino modified oligomericsiloxane may be represented by the following general formulae:

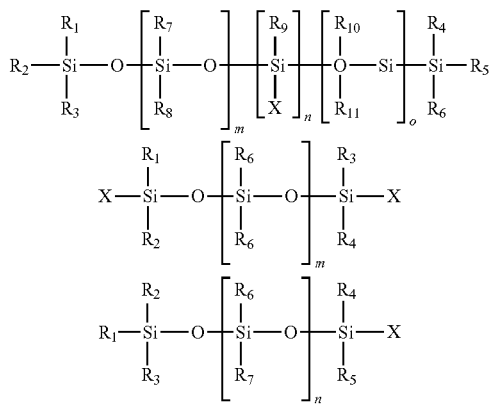

wherein, X includes mono amino, di-amino or amino-polyether.

wherein $R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl and phenyl derivatives.

wherein m, n and o can be 0 to 100.

In accordance with an embodiment, the oligomericsiloxane is a methylsiloxane wherein $R_1$, $R_2$, $R_3$, $R_4$, $R_5$, $R_6$, $R_7$, $R_8$, $R_9$, $R_{10}$ and $R_{11}$ is $CH_3$.

The carboxylic acid anhydride may include but is not limited to hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride or their eutectics.

The hardener component may further comprise of carboxylic acid anhydride in addition to the modified epoxy resin hardener. The carboxylic acid anhydride may include but is not limited to hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride or their eutectics.

In accordance with an aspect, the modified epoxy resin hardener is present in a concentration of at least 0.1 weight % with respect to the total weight of the hardener component.

The epoxy resin component may be any modified or unmodified cycloaliphatic epoxy including but not limited to hexahydrophthalic anhydride base diglycidyl ether, hydrogenated bisphenol A based diglycidyl ether and 3,4 epoxy cyclohexyl methyl carboxylate ester of 3,4 epoxy cyclohexyl alcohol.

For indoor usage applications requiring hydrophobicity, epoxy resin component may be selected from aromatic moieties like Bisphenol A, Bisphenol F or aliphatic molecules.

The ratio of the hardener component and the epoxy resin component in the epoxy resin composition is in a range from 1:1 to 10:7.

In accordance with an embodiment, the epoxy resin composition further comprises an accelerator. Accelerator, also referred to as catalysts, include those compounds which catalyze the reaction of the epoxy resin component with the hardener component. Accelerator, include but are not limited to 2,4,6-Tris(dimethylaminomethyl)phenol, benzyl dimethyl amine, methyl imidazole, 2-methyl imidazole, 2-ethyl-4-methyl-1H-imidazole, benzyl triethyl ammonium chloride, boron trichloride, boron trifluoridemonoethyl amine or their mixtures.

The accelerator is present in a concentration in a range of 0.01 to 10 weight % with respect to the total weight of the epoxy resin composition.

In accordance with an embodiment, the accelerator is a part of the hardener component.

In accordance with an alternate embodiment, the accelerator is a separate component.

In accordance with an embodiment, the epoxy resin composition may further comprise additives in accordance with intended application and purpose. Such additives include reinforcing inorganic fillers, extender inorganic fillers, polysiloxane mold release agents such as fatty acids, waxes, colorants, adhesion promoters, flame retardants, tougheners, flexibilizers and other additives generally used in electrical applications. In accordance with an embodiment, the additive is treated or untreated silica. By way of an example the additive is silican epoxysilane treated silica filler. The additives may be present in a concentration in a range of 0.1 to 95 weight % with respect to the total weight of the epoxy resin composition.

The disclosure also relates to an epoxy resin hardener. The epoxy resin hardener is a reaction product of a modified oligomericsiloxane and a carboxylic acid anhydride.

The modified oligomericsiloxane is an amino modified oligomericsiloxane having at least one amino group in each molecule. The amino group may be present at single end, both ends or side chain of the amino modified oligomericsiloxane.

The amino modified oligomericsiloxane may be represented by the following general formulae:

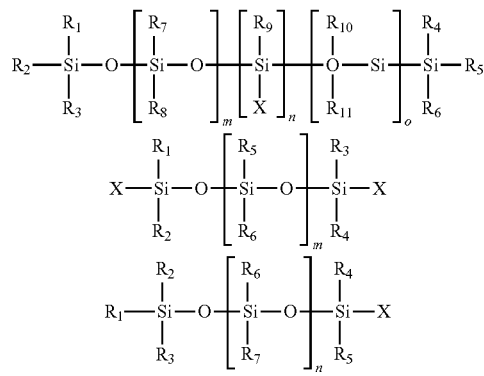

wherein, X includes mono amino, di-amino or amino-polyether.

wherein $R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl and phenyl derivatives.

wherein m, n and o can be 0 to 100.

In accordance with an embodiment, the oligomericsiloxane is a methylsiloxane wherein $R_1$, $R_2$, $R_3$, $R_4$, $R_5$, $R_6$, $R_7$, $R_8$, $R_9$, $R_{10}$ and $R_{11}$ is $CH_3$.

The carboxylic acid anhydride may include but is not limited to hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride or their eutectics.

In accordance with an embodiment, carboxylic acid anhydride in a range of 0.05 to 50 weight % of the amino modified oligomericsiloxane A process for the preparation of the modified epoxy resin hardener is also disclosed. The process comprises of mixing the carboxylic acid anhydride with the modified oligomericsiloxane and heating the mixture at an elevated temperature till the reaction product of carboxylic acid anhydride with the modified oligomericsiloxane is obtained.

In accordance with an embodiment, the process comprises of mixing the carboxylic acid anhydride with the amino modified oligomericsiloxane and heating the mixture to a temperature in a range of 80 to 140° C. for sufficient period for amide formation.

In accordance with an embodiment, the process is carried out under nitrogen atmosphere. In accordance with an embodiment, the entire carboxylic acid anhydride is not mixed with the amino modified oligomericsiloxane in a single step but added in two steps with an intermediate heating at a temperature in a range of 80 to 140° C. Adding the carboxylic acid anhydride in two steps allows for complete reaction of the carboxylic acid anhydride with the amino modified oligomericsiloxane resulting in a more stable modified epoxy resin hardener.

In accordance with an embodiment, carboxylic acid anhydride in added in a range of 0.05 to 50 weight % of the amino modified oligomericsiloxane.

A process for preparing the epoxy resin composition is also disclosed. The process comprises of mixing together the resin component, hardener component, accelerator and optionally additives to obtain the epoxy resin composition. The hardener component comprises of the modified epoxy resin hardener, obtained by reacting the modified oligomericsiloxane and the carboxylic acid anhydride. The mixing may take place under vacuum. The mixture may also be maintained at an elevated temperature.

Examples 1

Procedure for Preparing Modified Epoxy Resin Hardener 270 grams of siloxanediamine was heated to 80 to 90° C. under nitrogen atmosphere. 70.3 grams of methyl hexahydrophthalic anhydride was slowly added to get a mixture. The temperature of the mixture is controlled to 80 to 90° C. to get a hazy high viscous liquid. This hazy high viscous liquid is heated to 130-140° C. for 1 hour till the solution becomes a clear liquid with low viscosity. 340.3 grams for methyl hexahydrophthalic anhydride is added and the reaction mixture heated to a temperature of 130-140° C. for 1 hour. The reaction mixture is cooled to 50° C. to get the modified epoxy resin hardener.

Preparation of Hardener Component 75 grams of the modified epoxy resin hardener was added to 675 grams of methyl hexahydrophthalic anhydride and the mixture was heated to 80-90° C. for 1 hour to obtain the hardener component.

Sample Preparation

Prepare the mold and keep in the oven at 80° C. Mix the epoxy resin component, the hardener component and silica and vacuum the mixture at 80° C. for 15 min. Cast in the mold and place in the oven at 80° C. and cure at 80° C. for 6 hours followed by 140° C. for 10 hours.

Example 2

Commercially available amino modified oligomericsiloxane with dual end amino groups and functional group equivalent weight 400-450 gm/mol., viscosity 10-15 m·Pa·s at 25° C. is selected for modification of the carboxylic acid anhydride. Modified epoxy resin hardener is formed by reacting the amino modified oligomericsiloxane and saturated liquid carboxylic acid anhydride such as methyl hexahydrophthalic anhydride with anhydride equivalent weight 165-168 gm/eq and viscosity 30-70 m·Pa·s at 25° C. (used in excess of the stoichiometric ratio), at elevated temperatures. The modified epoxy resin hardener is stable hazy viscous liquid and is diluted with methyl hexahydrophthalic anhydride to reduce the viscosity to 50-80 m·Pa·s at 25° C. to obtain the hardener component.

Stability studies of the hardener component are conducted by centrifuging at high RPM and by measuring the change in viscosity with time. No phase separation or precipitation is observed after centrifuging and also viscosity measured over period of one year is found to be stable. FIG. 1 illustrates the stability of the hardener component.

Product Characterization:

Characterization of the modified epoxy resin hardener and the hardener component and determination of process and performance properties of the epoxy resin composition is done in combination with cycloaliphatic epoxy resin, diglycidyl ester of hexahydrophthalic anhydride, commercial grade Epotec YDH 184 from Aditya Birla Chemicals with epoxy equivalent weight 165-177 gm/eq, viscosity 450-900 m·Pa·s at 25° C., and tertiary amine-benzyl dimethylamine with viscosity 5-15 m·Pa·s at 25° C. as an accelerator.

The resin Epotec YDH184 and the hardener component in ratio of 95 parts per 100 parts of resin are preheated at 60° C. and mixed separately under vacuum and then mixed with silica filler, 325 parts per 100 parts of epoxy resin component or 62.5% by weight of the mixture. In this study epoxy silane treated silica grade W12 EST from Sibelco is used. Silica filler was dried at 200° C. for 24 hours in air circulatory oven and maintained at 60° C. before addition.

The premixed resin component and hardener component are held for long period of time prior to the addition of accelerator benzyl dimethylamine. The resulting mixture is thoroughly stirred to get homogenous mass and kept under vacuum for 15 minutes at 80° C. before pouring into the preheated molds.

Figure 2:
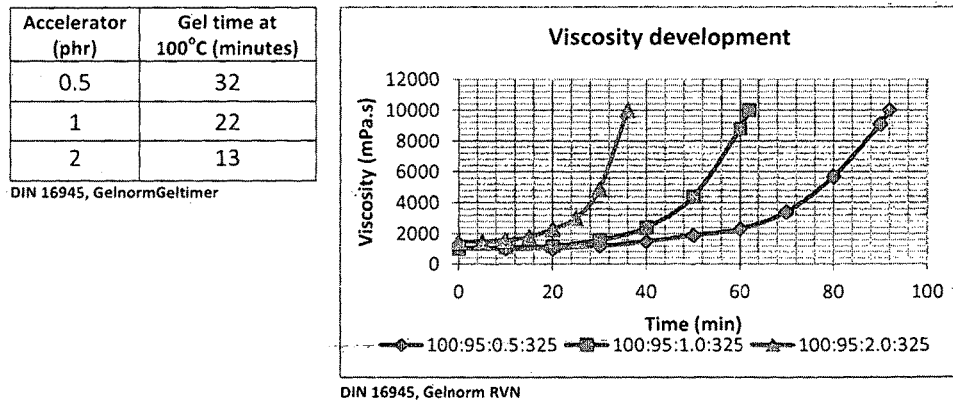
FIG. 2 illustrates the gel time, viscosity development with varying accelerator concentration.

Processing Properties of System:

Reactivity of the epoxy resin, hardener component comprising modified epoxy resin hardener and filler mix with varying levels of accelerator is determined by measuring the gel time and rise in viscosity by Gelnorm gel timer and Gelnorm RVN (Gel Instrument). FIG. 2 illustrates the Gel time, viscosity development with varying accelerator concentration. Optimum curing condition of 80° C. for 6 hours followed by 140° C. for 10 hours is established by determination of glass transition temperature (Tg) according to ISO 11357 test standard (DSC, Mettler Toledo), Tg was around 90-110° C. Tg value is not influenced by varying concentration of accelerator. In FIG. 2, ratio of the resin component:hardener component:accelerator:silica filler is 100:95:0.5:325; 100:95:1.0:325 and 100:95:2.0:325.

Performance Properties of System:

Test panels for determination of various performance properties of epoxy resin composition are prepared by vacuum casting flat panels with epoxy resin compositions in preheated molds. The panels are cured at 80° C. for 6 hours followed by 140° C. for 10 hours and de-molded, and cut by a cutter to get sample specimens.

Mechanical Properties:

Tensile and flexural properties are determined by Instron UTM 5569, 50KN the impact strength is determined by CEAST Resil Impact jr. and heat distortion temperature is determined by CEAST HDT instrument. Toughness or resilience of the cured epoxy resin composition is determined by measuring the fracture toughness in SENB mode by Instron UTM 5569. Critical stress intensity factor, $K1_C$ and Critical strain energy release rate, $G1_C$ are determined. Table 1 below illustrates the mechanical properties of the cured epoxy resin composition.

TABLE 1

Mechanical Properties of Cured System

| Property | Test method | Unit | Value |
| --- | --- | --- | --- |
| Tensile strength | ISO 527 | MPa | 93.4 |
| Tensile elongation | | % | 1.74 |
| Tensile modulus | | MPa | 10,600 |
| Flexural strength | ISO 178 | MPa | 154.2 |
| Flexural modulus | | MPa | 11,200 |
| Impact strength | ISO R 179 | $KJ/m^2$ | 8.6 |
| Heat Distortion temperature (HDT) | ISO R 75 | ° C. | 96.4 |
| Critical Stress Intensity Factor ($K_{1c}$) | ISO 13586 | $MPa \cdot m^{1/2}$ | 2.19 |
| Critical Strain Energy Release Rate ($G_{1c}$) | | $J/m^2$ | 869.09 |

Electrical Properties:

Insulating properties such as dielectric strength, dissipation factor and dielectric constant, comparative tracking index and volume resistivity are determined by dielectric rigidity instrument, Q-meter, CTI instrument and Teraohm-meter from CEAST. Table 2 illustrates the electrical properties of the cured epoxy resin composition.

TABLE 2

Electrical Properties of Cured epoxy composition

| Property | Test method | Unit | Value |
| --- | --- | --- | --- |
| Dielectric constant at 23° C., 1 MHz | IEC 60250 | — | 3.2 |
| Dissipation factor at 23° C., 1 MHz | IEC 60250 | % | 1.2 |
| Comparative tracking index | IEC 60112 | Volts | >600 |
| Dielectric strength (t = 2 mm) | IEC 60243-1 | KV/mm | 21.7 |
| Volume resistivity | IEC 60093 | Ohm-cm | $>10^{16}$ |

Figure 3:
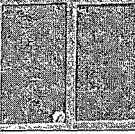
FIG. 3 illustrates the results of the test panels exposed in QUV Weather-O-Meter.
Figure 3:
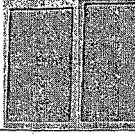
Figure 3:
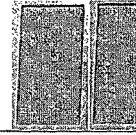
Figure 3:
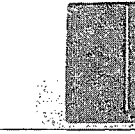

Accelerated UV Resistance Test:

Suitability for outdoor applications was confirmed by exposing the test panels in QUV weather-o-meter from Q-LAB Corporation. The machine has QVB-313 lamps; irradiance value is set at 0.55 $W/m^2$ with test program comprising of 4 hours UV plus 4 hours condensation cycle and temperature of 50° C. Test panels are inspected for discoloration and chalking after 100, 500 and 1000 test cycles: FIG. 3 illustrates the results of the test panels exposed in QUV Weather-O-Meter.

Mechanical, electrical and UV weatherability of the system indicate comparative performance with conventional epoxy systems used for outdoor electrical applications.

Hydrophobic Effect and Self-Healing Behavior:

Contact angle of the cured test panels is measured according to ASTM D7334 as 96.60 and Hydrophobicity Class (HC) determined according to the STRI Hydrophobicity classification guideline (Guide 1, 92/1) as HC 1 (only discrete droplets are formed, receding contact angle=>80 deg for majority of droplets).

Figure 4:
FIG. 4 illustrates the results of the plasma exposure study to determine hydrophobicity recovery.
Figure 4:
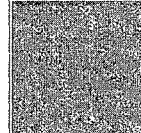
Figure 4:
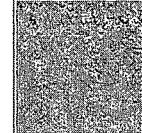
Figure 4:
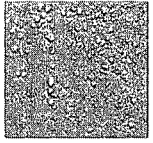

System is considered self-healing if it recovers from loss in hydrophobicity. In order to determine the recovery effect or self-healing behavior of the epoxy resin composition, cured test panels are exposed to plasma, for a treatment time of 2 minutes, at a pressure of 2-3 mbar, oxygen gas and output at 200 Watt. The exposure results in loss of hydrophobicity with the hydrophobicity class changing from HC 1 to HC 7 when measured immediately after plasma exposure. The hydrophobicity class is found to change with time indicative of recovery or self-healing, and after 24 hours of plasma exposure the hydrophobicity is restored to HC 2. FIG. 4 illustrates the results of the plasma exposure study to determine hydrophobicity recovery.

Specific Embodiments are Disclosed Below

A self-healing hydrophobic epoxy resin composition comprising an epoxy resin component and a hardener component, the hardener comprising at least 0.1 weight % of a modified epoxy resin hardener. The modified epoxy resin hardener is a reaction product of an amino modified oligomericsiloxane and a carboxylic acid anhydride.

Such epoxy resin composition(s), wherein the amino modified oligomericsiloxane is represented by the structure:

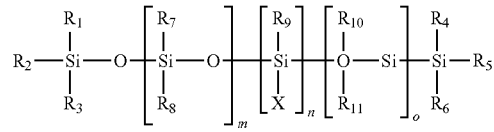

wherein X is a monoamino, di-amino or amino-polyether; $R_1$, $R_2$, $R_3$, $R_4$, $R_5$, $R_6$, $R_7$, $R_8$, $R_9$, $R_{10}$ and $R_{11}$ are same or different groups and include homologues of methylene terminated by methyl, phenyl or substituted phenyl; and m, n and o is an integer from 0 to 100.

Such epoxy resin composition(s), wherein the amino modified oligomericsiloxane is represented by the structure:

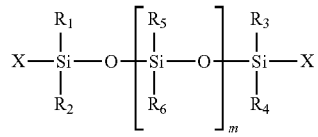

wherein X is a monoamino, di-amino or amino-polyether; $R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl or substituted phenyl; and m, n and o is an integer from 0 to 100.

Such epoxy resin composition(s), wherein the amino modified oligomericsiloxane is represented by the structure:

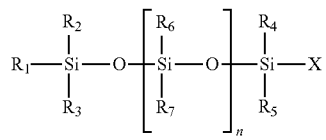

wherein X is a monoamino, di-amino or amino-polyether; $R_1, R_2, R_3, R_4, R_5, R_6, R_7, R_8, R_9, R_{10}$ and $R_{11}$ are same or different groups and include, homologues of methylene terminated by methyl, phenyl or substituted phenyl; and m, n and o is an integer from 0 to 100.

Such epoxy resin composition(s), wherein $R_1, R_2, R_3, R_4, R_5, R_6, R_7, R_8, R_9, R_{10}$ and $R_{11}$ is $CH_3$.

Such epoxy resin composition(s), wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

Such epoxy resin composition(s), wherein the modified epoxy resin hardener comprises carboxylic acid anhydride in a range of 0.05 to 50 weight % of the amino modified oligomericsiloxane.

Such epoxy resin composition(s), wherein the hardener component further comprises carboxylic acid anhydride.

Such epoxy resin composition(s), wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

Such epoxy resin composition(s), wherein the epoxy resin component comprises a modified or unmodified cycloaliphatic epoxy compound.

Such epoxy resin composition(s), wherein the epoxy resin component is selected from hexahydrophthalic anhydride base diglycidyl ether, hydrogenated bisphenol A based diglycidyl ether and 3,4 epoxy cyclohexyl methyl carboxylate ester of 3,4 epoxy cyclohexyl alcohol.

Such epoxy resin composition(s), wherein the ratio of the hardener component to the epoxy resin component is in a range of 1:1 to 10:7.

Such epoxy resin composition(s), further comprising 0.01 to 10 weight % of an accelerator selected from a group comprising 2,4,6-Tris(dimethylaminomethyl)phenol, benzyldimethyl amine, methyl imidazole, 2-methyl imidazole, 2-ethyl-4-methyl-1H-imidazole, benzyl triethyl ammonium chloride, boron trichloride, boron trifluoridemonoethyl amine and mixtures thereof.

Such epoxy resin composition(s), further comprising 0.1 to 95 weight % of one or more additives.

Such epoxy resin composition(s), wherein the additive is treated or untreated silica.

Further Specific Embodiments are Disclosed Below

An epoxy resin hardener, a reaction product of an amino modified oligomericsiloxane and a carboxylic acid anhydride.

Such epoxy resin hardener(s), wherein the amino modified oligomericsiloxane is represented by the structure:

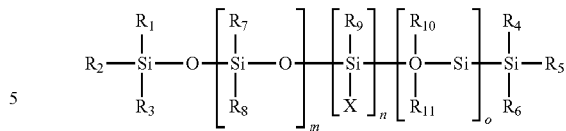

wherein X is a monoamino, di-amino or amino-polyether; $R_1, R_2, R_3, R_4, R_5, R_6, R_7, R_8, R_9, R_{10}$ and $R_{11}$ are same or different groups and include, homologues of methylene terminated by methyl, phenyl or substituted phenyl; and m, n and o is an integer from 0 to 100.

Such epoxy resin hardener(s), wherein the amino modified oligomericsiloxane is represented by the structure:

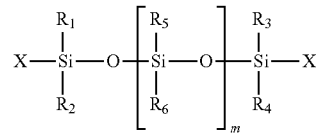

wherein X is a monoamino, di-amino or amino-polyether; $R_1, R_2, R_3, R_4, R_5, R_6, R_7, R_8, R_9, R_{10}$ and $R_{11}$ are same or different groups and include, homologues of methylene terminated by methyl, phenyl or substituted phenyl; and m, n and o is an integer from 0 to 100.

Such epoxy resin hardener(s), wherein the amino modified oligomericsiloxane comprises structure(s) is represented by the structure:

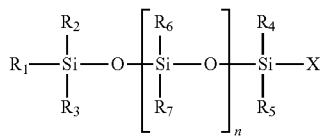

wherein X is a monoamino, di-amino or amino-polyether; $R_1, R_2, R_3, R_4, R_5, R_6, R_7, R_8, R_9, R_{10}$ and $R_{11}$ are same or different groups and include, homologues of methylene terminated by methyl, phenyl or substituted phenyl; and m, n and o is an integer from 0 to 100.

Such epoxy resin hardener(s), wherein $R_1, R_2, R_3, R_4, R_5, R_6, R_7, R_8, R_9, R_{10}$ and $R_{11}$ is $CH_3$.

Such epoxy resin hardener(s), wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

Such epoxy resin hardener(s) comprising carboxylic acid anhydride in a range of 0.05 to 50 weight % of the amino modified oligomericsiloxane.

Further Specific Embodiments are Disclosed Below

A process for preparing an epoxy resin hardener comprising heating an amino modified oligomericsiloxane to a temperature in a range of 80° C. to 90° C.; adding a carboxylic acid anhydride to the heated amino modified oligomericsiloxane to obtain a mixture thereof; and heating the mixture to a temperature in a range of 80 to 140° C. to obtain the epoxy resin hardener, the entire process being carried out under nitrogen atmosphere.

Such process(es) for preparing an epoxy resin hardener, wherein the carboxylic acid anhydride is added to the amino modified oligomericsiloxane in two steps, each step followed by heating to a temperature in a range of 80° C. to 140° C.

Such process(es) for preparing an epoxy resin hardener, wherein the carboxylic acid anhydride is mixed with the amino modified oligomericsiloxane in a range of 0.05 to 50 weight % of the amino modified oligomericsiloxane.

Such process(es) for preparing an epoxy resin hardener, wherein the amino modified oligomericsiloxane is selected from the structures represented by:

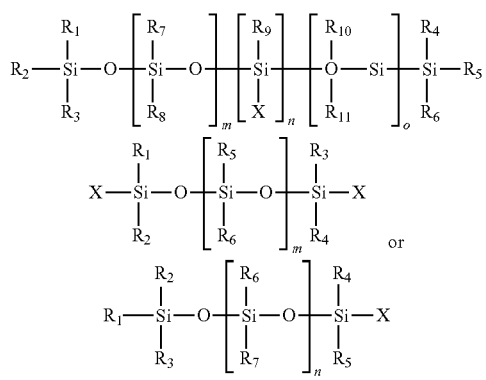

wherein X is a monoamino, di-amino or amino-polyether; $R_1$, $R_2$, $R_3$, $R_4$, $R_5$, $R_6$, $R_7$, $R_8$, $R_9$, $R_{10}$ and $R_{11}$ are same or different groups and include homologues of methylene terminated by methyl, phenyl or substituted phenyl; and m, n and o is an integer from 0 to 100.

Such process(es) for preparing an epoxy resin hardener, wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

INDUSTRIAL APPLICABILITY

The epoxy resin composition as disclosed having a reaction product of an amino modified oligomericsiloxane, preferably a methyl siloxane and carboxylic acid anhydride provides self-healing and intrinsically hydrophobic nature to the epoxy resin composition. This allows the electrical insulating components prepared from said epoxy resin composition to be used in outdoor application without such problems as surface leakage currents and arching. The intrinsic hydrophobic nature of the disclosed epoxy resin composition enables the recovery of hydrophobicity (self-healing) within 24 hours after the same is compromised. These products can be used in current and potential transformers, bushings, insulators etc.

Additionally, the modified epoxy resin hardener having the reaction product of the amino modified oligomericsiloxane, preferably a methyl siloxane with carboxylic acid anhydride as disclosed provides good hydrophobicity when used as a hardener for epoxy resins. Further being chemically modified it provides improved storage stability addressing concerns on limited shelf life observed in case of existing systems.

We claim:

1. A self-healing hydrophobic electrical insulating epoxy resin composition comprising:
   an epoxy resin component; and
   a hardener component comprising at least 0.1 weight % of a modified epoxy resin hardener, the modified epoxy resin hardener is a reaction product of an amino modified oligomericsiloxane and a carboxylic acid anhydride, wherein the amino modified oligomericsiloxane is represented by a structure selected from:

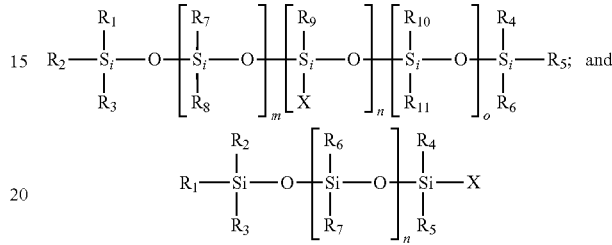

wherein X comprises a monoamine, diamine, or amino-polyether;

$R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl or substituted phenyl; and m, n and o is an integer from 0 to 100.

2. An epoxy resin composition as claimed in claim 1, wherein $R_1$, $R_2$, $R_3$, $R_4$, $R_5$, $R_6$, $R_7$, $R_8$, $R_9$, $R_{10}$ and $R_{11}$ is $CH_3$.

3. An epoxy resin composition as claimed in claim 1, wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

4. An epoxy resin composition as claimed in claim 1, wherein the modified epoxy resin hardener is derived from the carboxylic acid anhydride and wherein, the carboxylic acid anhydride group is present in a range of 0.05 to 50 weight % of the amino modified oligomericsiloxane.

5. An epoxy resin composition as claimed in claim 1, wherein the hardener component further comprises carboxylic acid anhydride.

6. An epoxy resin composition as claimed in claim 5, wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

7. An epoxy resin composition as claimed in claim 1, wherein the epoxy resin component comprises a modified or unmodified cycloaliphatic epoxy compound.

8. An epoxy resin composition as claimed in claim 7, wherein the epoxy resin component is selected from hexahydrophthalic anhydride base diglycidyl ether, hydrogenated bisphenol A based diglycidyl ether and 3,4 epoxy cyclohexyl methyl carboxylate ester of 3,4 epoxy cyclohexyl alcohol.

9. An epoxy resin composition as claimed in claim 1, wherein the weigh ratio of the hardener component to the epoxy resin component is in a range of 1:1 to 10:7.

10. An epoxy resin composition as claimed in claim 1, further comprising 0.01 to 10 weight % of an accelerator selected from a group comprising 2,4,6-Tris(dimethylaminomethyl)phenol, benzyldimethyl amine, methyl imidazole, 2-methyl imidazole, 2-ethyl-4-methyl-1H-imidazole, benzyl triethyl ammonium chloride, boron trichloride, boron trifluoridemonoethyl amine and mixtures thereof.

11. An epoxy resin composition as claimed in claim 1, further comprising 0.1 to 95 weight % of one or more additives.

12. An epoxy resin composition as claimed in claim 11, wherein the additive is treated or untreated silica.

13. An epoxy resin hardener, the epoxy resin hardener is a reaction product of an amino modified oligomericsiloxane and a carboxylic acid anhydride, wherein the amino modified oligomericsiloxane is represented by a structure:

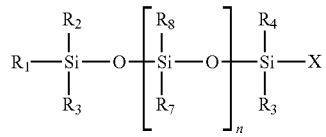

wherein X comprises a monoamine, diamine, or aminopolyether;

$R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl or substituted phenyl; and n is an integer from 0 to 100.

14. An epoxy resin hardener as claimed in claim 13, wherein $R_1$, $R_2$, $R_3$, $R_4$, $R_5$, $R_6$, $R_7$, $R_8$, $R_9$, $R_{10}$ and $R_{11}$ is $CH_3$.

15. An epoxy resin hardener as claimed in claim 13, wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

16. An epoxy resin hardener as claimed in claim 13 comprising carboxylic acid anhydride in a range of 0.05 to 50 weight % of the amino modified oligomericsiloxane.

17. A process for preparing an epoxy resin hardener, the process comprising:
heating an amino modified oligomericsiloxane to a temperature in a range of 80° C. to 90° C.;
adding a carboxylic acid anhydride to the heated amino modified oligomericsiloxane to obtain a mixture thereof;
heating the mixture to a temperature in a range of 80 to 140° C. to obtain the epoxy resin hardener, the entire process being carried out under nitrogen atmosphere.

18. A process as claimed in claim 17, wherein the carboxylic acid anhydride is added to the amino modified oligomericsiloxane in two steps, each step followed by heating to a temperature in a range of 80° C. to 140° C.

19. A process as claimed in claim 17, wherein the carboxylic acid anhydride is mixed with the amino modified oligomericsiloxane in a range of 0.05 to 50 weight % of the amino modified oligomericsiloxane.

20. A process as claimed in claim 17, wherein the amino modified oligomericsiloxane is represented by a structure selected from:

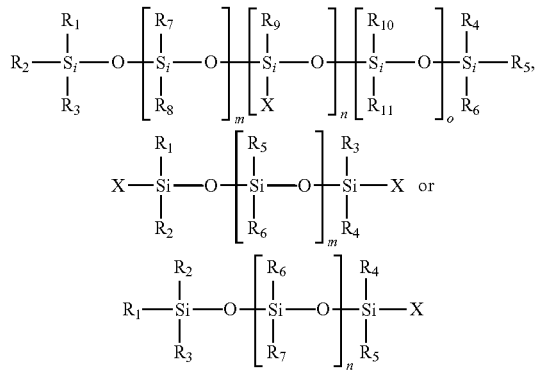

wherein X comprises a monoamine, diamine, or aminopolyether;

$R_1$, $R_2$, $R_3$, $R_4$, $R_5$, $R_6$, $R_7$, $R_8$, $R_9$, $R_{10}$ and $R_{11}$ are same or different groups and include, homologues of methylene terminated by methyl, phenyl or substituted phenyl; and m, n and o is an integer from 0 to 100.

21. A process as claimed in claim 17, wherein the carboxylic acid anhydride is selected from hexahydrophthalic anhydride, methyltetrahydrophthalic anhydride, methylhexahydrophthalic anhydride, tetrahydrophthalic anhydride, phthalic anhydride, maleic anhydride, nadicmethyl anhydride, dodecenyl succinic anhydride and eutectic mixtures thereof.

* * * * *